US010050967B2

(12) United States Patent
Brique et al.

(10) Patent No.: US 10,050,967 B2
(45) Date of Patent: Aug. 14, 2018

(54) USER IDENTIFICATION BASED ACCESS CONTROL

(71) Applicant: Nagravision S.A., Cheseaux-sur-Lausanne (CH)

(72) Inventors: Olivier Brique, Jongny (CH); Salvatore Bocchetti, Lausanne (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 17 days.

(21) Appl. No.: 14/183,400

(22) Filed: Feb. 18, 2014

(65) Prior Publication Data

US 2015/0237052 A1    Aug. 20, 2015

(51) Int. Cl.
*H04L 29/06*    (2006.01)

(52) U.S. Cl.
CPC .......... *H04L 63/10* (2013.01); *H04L 63/0861* (2013.01)

(58) Field of Classification Search
CPC .......... G06F 21/00; G06F 21/53; G06F 21/51; G06F 9/44; G06F 8/65; G06F 19/3468; G06F 19/3412; G06F 9/445; G06F 9/44505; G06F 9/4451; G06F 2221/2141; G06F 8/61; G06F 8/60; G06F 21/6218; H04L 63/0861; H04L 63/10; H04L 9/00; H04L 63/107; H04L 63/0853; H04L 63/18; G06Q 30/00; G06Q 30/0255; G06Q 30/02; H04N 7/16; A61B 5/04; A61B 5/16; A61B 5/4035
USPC ............. 726/1–4, 26–27; 717/172–174, 176; 713/161; 705/14.53; 725/12
See application file for complete search history.

(56) References Cited

U.S. PATENT DOCUMENTS

| 8,281,366 | B1 | 10/2012 | McCorkendale et al. |
| 8,769,621 | B2 * | 7/2014 | Wechsler ............ G06F 21/6245 726/4 |
| 8,839,234 | B1 * | 9/2014 | Voronkov ..................... 717/172 |
| 9,110,750 | B2 * | 8/2015 | Somani ..................... G06F 8/61 |
| 2007/0208934 | A1 * | 9/2007 | Heffez .................. H04L 63/107 713/161 |
| 2008/0141293 | A1 | 6/2008 | Blanchard et al. |
| 2008/0282319 | A1 * | 11/2008 | Fontijn ................... G06F 21/53 726/1 |
| 2009/0327076 | A1 * | 12/2009 | Sinyagin ............ G06Q 30/0255 705/14.53 |
| 2009/0328089 | A1 * | 12/2009 | Pradeep ................... A61B 5/16 725/12 |
| 2012/0015629 | A1 | 1/2012 | Olsen et al. |
| 2012/0021724 | A1 | 1/2012 | Olsen et al. |

OTHER PUBLICATIONS

International Search Report issued in International Application No. PCT/EP2015/053379 dated Jul. 28, 2015.
Written Opinion issued in International Application No. PCT/EP2015/053379 dated Jul. 28, 2015.

* cited by examiner

*Primary Examiner* — Thanhnga B Truong
(74) *Attorney, Agent, or Firm* — DLA Piper LLP (US)

(57) ABSTRACT

A user's access to software applications installed on a device is limited by evaluating the context in which the user requests access to the application and determining, based on the context analysis, whether or not the user is to be given access to the application. When it is determined that the user requesting access is not a primary authorized user, the primary authorized user may be notified of the attempt to access the application.

9 Claims, 10 Drawing Sheets

USER IDENTIFICATION BASED ACCESS CONTROL

BACKGROUND

This document relates to restricting the use of a device to an authorized user.

Portable communications devices such as tablets and smartphones have recently gained popularity among users. Users can install software applications, sometimes called mobile applications, which enable user interaction with content and services such as multimedia programming, bank websites, games, educational material, etc.

SUMMARY

The present document discloses techniques for limiting access to software applications installed on electronic devices based on identity of the user requesting access to the software application. The user identity may be established based on contextual circumstances associated with the access request. The user identity may be established based on behavioral circumstances at the time of request to access the application. The user access may be limited based on control inputs or settings performed by a primary user such as an owner of a device.

In one aspect, a method of controlling access to a user device is disclosed. The method includes receiving, from a user interface, a request for access to a first resource of the user device, permitting access to the first resource when the user device is in a proximity of a trusted device, and controlling access according to a rule specified in a configuration file when the user device is not in the proximity of the trusted device.

In another aspect, a disclosed method of controlling access to a user device, comprises providing a menu of multiple applications on a user interface, receiving a request to launch an application, estimating, based on a user behavior, an identity of a user making the request to launch the application, determining, based on a current access policy and the estimated user identity, whether or not the user is allowed to launch the requested application and controlling user access to the requested application according to the determination.

In yet another aspect, an apparatus for controlling application-level access offered by a user device is disclosed. The apparatus includes a control interface module that displays a control interface allowing entry of an access policy for the user device, wherein the access policy specifies rules for a user device to control application-level access to applications installed on the user device, a configuration file module that generates a configuration file from the received access policy, and a communication module that transfers the configuration file to the user device.

These, and other, aspects are described below in the drawings, the description and the claims.

BRIEF DESCRIPTION OF THE DRAWINGS

Like reference symbols in the various drawings indicate like elements.

DETAILED DESCRIPTION

In various situations, it may be desirable to restrict access to various devices or certain software applications installed on various devices including appliances, mobile devices such as tablets and smartphones, laptop computers and others. For example, tablets and similar devices are increasingly used to entertain kids, sometimes as "nanny surrogates" or without adult supervision. In order to seek a healthy balance between time spent using the device and "offline time", parents often provide manual access to the device either physically controlling the device (e.g., handing out the device at particular moments/under supervision/ . . . ) or the access to it (e.g., password to get access to the device).

Access to applications installed on a tablet device may be global or may be application-specific. For example, some products in market today allow access to all applications installed on the platform after a user gets past the initial screen. Individual applications may include their own login or other authentication techniques. For example, a stock account application may provide access to the application, but not to user-specific data that can be seen via the application without presenting additional credential (e.g., username and password). However, there is no mechanism to control a subset of all apps on a tablet or a pad device such that, e.g., access to a weather app may be allowed to all users, and access to video games may be allowed to a child in the house only when additional criteria are satisfied (e.g., the correct times of day or no more than X hours of video gaming is already used in the day, and so on).

The technology disclosed in the present document can be used to solve the above-discussed access problem and others. In some embodiments, a wide set of contextual/behavioral/command inputs are taken into account. Based on a direct or indirect determination of who the user requesting an app is, a user identity is first determined. Next, a configuration rule is used to check if the user should be provided access to a requested application at the time of the request. Appliances, such as refrigerators, microwave ovens, etc. are becoming increasingly "intelligent" and enable user interaction. The techniques presented in this document may be used in restricting or limiting user interaction with appliances. These, and other, techniques are described in the present document.

Figure 1:
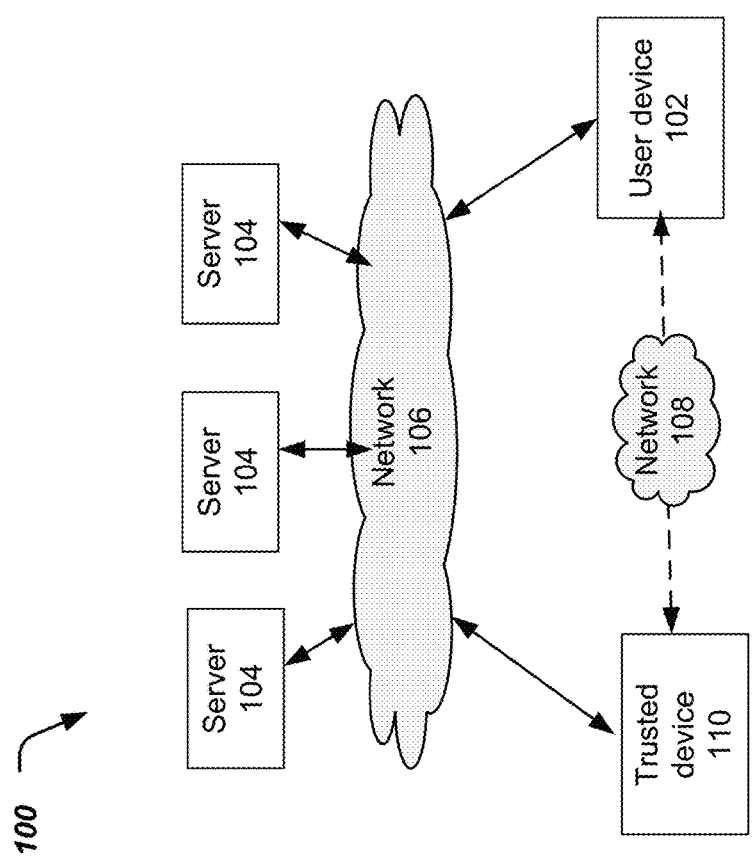
FIG. 1 depicts high level architecture of an example communication network.

FIG. 1 depicts an exemplary system 100 in which a user device 102 is able to communicate with a plurality of servers 104 via a network 106 to receive voice, video and data. In some embodiments, a network 108 may be used for communication between the user device 102 and a trusted device 110.

The user device 102 may be a handheld or portable device such as a mobile phone, a tablet computer, a wearable device (e.g., a wrist watch), a laptop, a television, etc. The user device 102 may include a user interface in which one or more applications available for user access may be displayed. For example, in some embodiments, the applications may be displayed to a user and made accessible to the user via a touch-sensitive screen.

Figure 2:
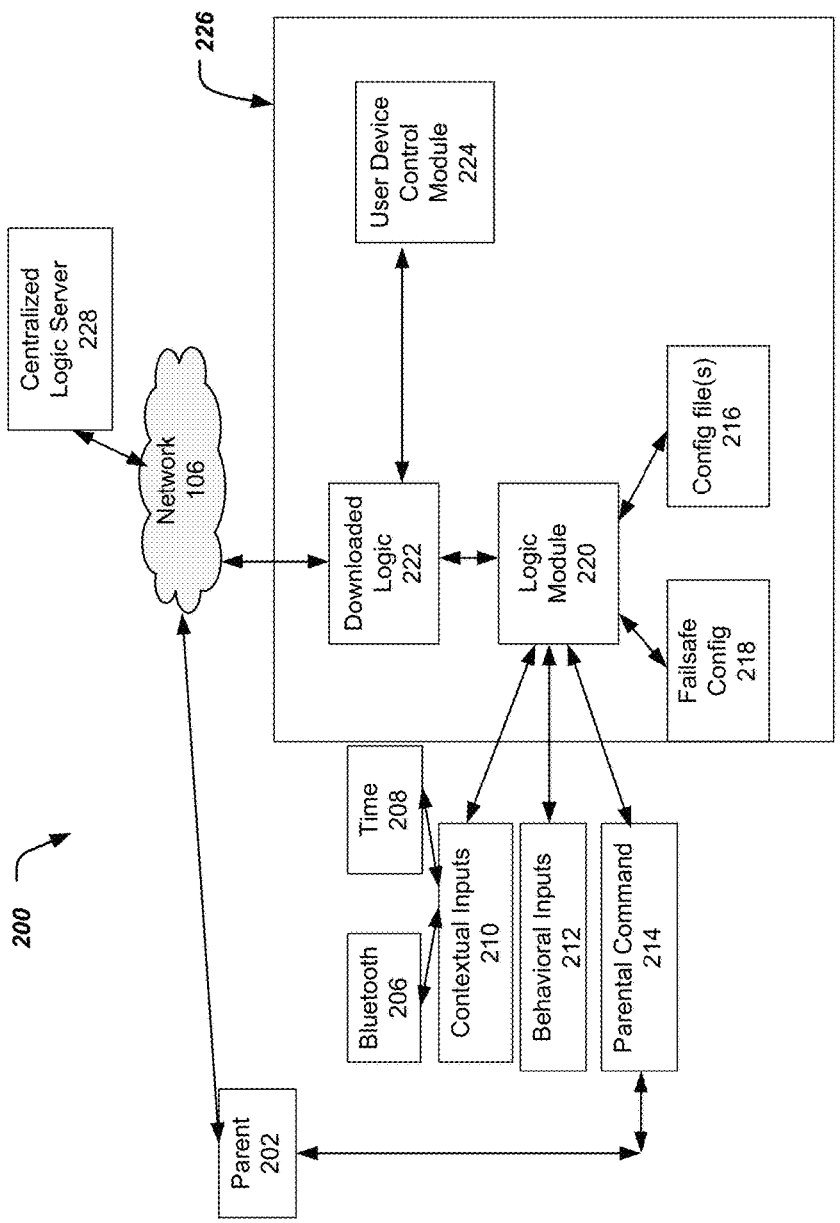
FIG. 2 depicts exemplary content access control architecture.

FIG. 2 is a block diagram representation of an exemplary system 200 in which a centralized logic server 228 may be used to control application-level access for a user device 102. A user (e.g., a parent 202 or a system administrator) may be able to interact with the server 228 via network 106, as described in this document. A sub-system 226, which may be a part of the user device 102, may include downloaded logic 222 that is received at the user device 102 from the centralized logic server 228. The sub-system 226 may include a logic module 220 that uses the downloaded logic 222 and may further have access to one or more configuration files 216. In some embodiments, the logic module 220 may also have access to a failsafe configuration 218 that may be used as a default, or fallback logic in case of a failure of the config files).

The parent 202 may provide parental commands 214 to the logic module to control application level access to the user device 102. The logic module 220 may receive (solicited or un-solicited) contextual inputs and behavioral inputs. The contextual inputs may include time input 208 and a short range wireless interface input such as Bluetooth 206, Wi-Fi or a combination thereof.

The user device control module 224 may control user access to applications installed on the user device 102 and available to users for execution. In some embodiments, a launch sensing module may be configured to monitor or capture the messaging between a user interface (e.g., touch screen) and the operating system of the user device 102. For example, when a user selects an application, e.g., by a finger touch or by a mouse click, the launch sensing module may capture that event and notify the user device control module 224 that an application launch has been requested by a user. Upon receiving the notification, the user device control module 224 may then initiate one of the access control techniques described in the present document. Similarly, the system may act with respect to a "sub-application", e.g., a set of features of an application that itself may be an application controlled by the "User Control Device Module" 224.

As previously described, the logic module 220 may use various inputs in determining the user who has requested the application launch and whether or not to permit access to the requested app. Some example inputs used in various embodiments are described below.

Contextual Inputs

In some embodiments, contextual input includes temporal information such as the time of the day or the day of the week. In one example, when the time of the day is outside of typical school hours (e.g., after 5 PM), this may weigh in favor of assuming that the user may be a untrusted user. In another example, a different rule may be used on weekends (e.g., permitting access to video games) than weekdays.

In some embodiments, the presence of adult members of the family may be detected. In some embodiments, an adult user is considered to be a trusted user for the operation of a user device. In some embodiments, the presence detection may use a proximity sensing techniques such as sensing the presence of a family member's mobile phone via e.g. Bluetooth or any other proximity evidence (e.g., Wi-Fi). In some embodiments, presence detection may be performed using voice recognition/speaker recognition by capturing voice signals.

In some embodiments, the user device may include a pairing module. The pairing module may allow a trusted user (e.g., a parent user) to pair his presence indicator device (e.g., a mobile phone with Bluetooth interface) to the user device. In some embodiments, a device sensor module may sense for other devices in the nearby area with which such pairing for access control is possible. When a user device 102 is truly in a mobile situation (e.g., using a tablet computer in a high school), then there may be too many phones coming in and going out of the vicinity of the mobile device. To avoid such false pairing opportunities, the pairing module may use a first threshold, which is compared with the number of times a pairable device goes in and out of the vicinity of the user device. For example, a phone that is in the proximity once every day may be a family member's phone and potentially pairable. The pairing module may then prompt a user whether the user wants to pair this phone with the user device for access control (i.e., make it into a trusted device).

In some implementations, the device sensor module may use a second threshold for comparing a duration for which a pairable device is in the vicinity of the user device. In some embodiments, pairable devices that are in vicinity for an extended period of time (e.g., for 8 hours overnight) may be assumed to be family member's phones and the pairing module may prompt the user about whether the user wants to pair this pairable device with the user device for access control. Other ways in which devices may be made trusted devices is by receiving information about these devices from another trusted device. For example device 1 may be a trusted device based on communication over network 1. However, device 1 may also be aware of another device 2, which can also become a trusted device. In such a case, device 1 may initiate trust setup between the user device and device 2. For example, a set-top box, being aware that a parent has logged into the set-top box (e.g., supplied parental access PIN), may communicate with a home gateway over a wired LAN connection, which in turn may send information to a tablet computer about a Wi-Fi enabled phone that can become a trusted device.

In some embodiments, contextual inputs may include additional elements related to the physical/logical state of the device. In some embodiments, a user device may be purchased with access control techniques disclosed in the present document pre-installed on the user device. In some embodiments, a user may be able to install access control software on the user device. During installation and initialization, a user may be given the option to "mate" his phone and other devices that are to be considered trusted and used for determining his proximity to the user device.

Behavioral Inputs

Various behavioral inputs may be used in making a determination of who the user currently using the user device is. In some embodiments, some type of video identification (image recognition) may be performed using a camera module to take a picture of the user. In some embodiments, voice recognition may be used to capture the user's voice (e.g., my making the user repeat a word or phrase displayed on the screen). In some embodiments, a user's identity may be established via a specific "per kid" password. In some embodiments, the adult or trusted user is given opportunity to provide his facial picture or voice during the training or initial setup of the access control functionality.

In some embodiments, a particular question (or multiple questions) may be posed to the user on the user interface. In some embodiments, different questions of increasing difficulty may be presented to the user to determine the age of the kid: e.g. if can do multiplications, knows complex words, etc. In some embodiments, biometric recognition (e.g., fingerprint analysis) may be performed.

In some embodiments, a user's usage pattern may be tracked with respect to attempts to access a specific application. For example, repeated attempts to access certain restricted content may result in stricter rules to be imposed, e.g., trying to seek one prohibited content once may be a coincidence and be merely blocked; repeated trials to access prohibited content may indicate the kid is trying to actively search to avoid controls, then the device enters in a more restricted mode.

In some embodiments, the time spent doing a certain operation (e.g., total time spent using the device during the day) may be monitored and use while implementing access control rules.

Parental/Trusted User Inputs

In some embodiments, access to a device may be controlled via commands sent to the system, either locally, e.g., input of an unlock pin code or remotely, e.g., via SMS commands, via an internet web portal.

In some embodiments, a parent/trusted user may be able to give time tokens allowing access to applications to grant access to perform a particular action for a limited amount of time or for a limited number of times.

The previously described centralized logic server 228 may act as the control device that controls resource access on the user device. A parent may be able to interact with the centralized logic server 228 via a control interface that is provided over the network 106 and specify an access policy, including any concessions or tokens, as noted above. The access policy may be "pushed" by the control device to the user device on a periodic basis or when changed. Alternatively, the access policy may be "pulled" or requested by a policy update module operating on the user device to download new access policy to update the downloaded logic 222. In some embodiments, in case of errors (e.g., communication errors or timeout errors), the failsafe configuration 218 may be implemented instead of a current access policy as reflected a working configuration file 216.

The logic 222 can be programmed by the user (parents) in order to define the actual "logic" to be used to elaborate the inputs. The logic 222 can be centrally stored, e.g., on an internet server, in order to allow centralized configuration and update and then replicated locally on the device at regular intervals.

Failure to obtain an up to date configuration from the server can result in reverting to a fail-safe state (e.g. "lock all device"), in a manner similar to PA (Positive Addressing)

In some embodiments the logic [L] represents the "formula" to be applied to the inputs [I] in order to obtain the device configuration rules [DCR]. In other words,

```
If (L.date >= time.current( ) - max_delta )
{ DCR = L ( I ) }
Else
{ DCR = DCR_failsafe_config }
```

Where L.date is the date of the latest update of the Logic, time.current( ) represents the current timestamp, max_delta is the maximum is the max time than can elapse before a Logic is considered out to date and a fail-safe configuration is forced and DCR_failsafe_config is a predefined DCR to be applied when an up to date DCR cannot be retrieved for whatever reason.

As an example, the Logic 222 can express a rule such as:

If at least one parent is in the house (sensed via Bluetooth), allow full access to the device If parents are not at home, allow max 1 h of gaming per day and only between 10 am and 3 pm).

If an un-trusted user (e.g., a child in the house) tries to watch inappropriate contents more than twice the same day, completely lock down the device.

In some embodiments, the logic or access policy may be a global access policy, which may be modified on a user-device-specific interface by a trusted user. For example, this interface may allow the trusted user to override the global access policy. An adult user may, e.g., have two different user devices—a 10 inch pad and a 7 inch tablet device and may desire to control his child's access to both devices using a same global access policy. However, the adult may want to enforce a stricter access control policy for the 10 inch pad because the adult may have a different set of applications loaded on the pad versus on the tablet device.

Figure 3:
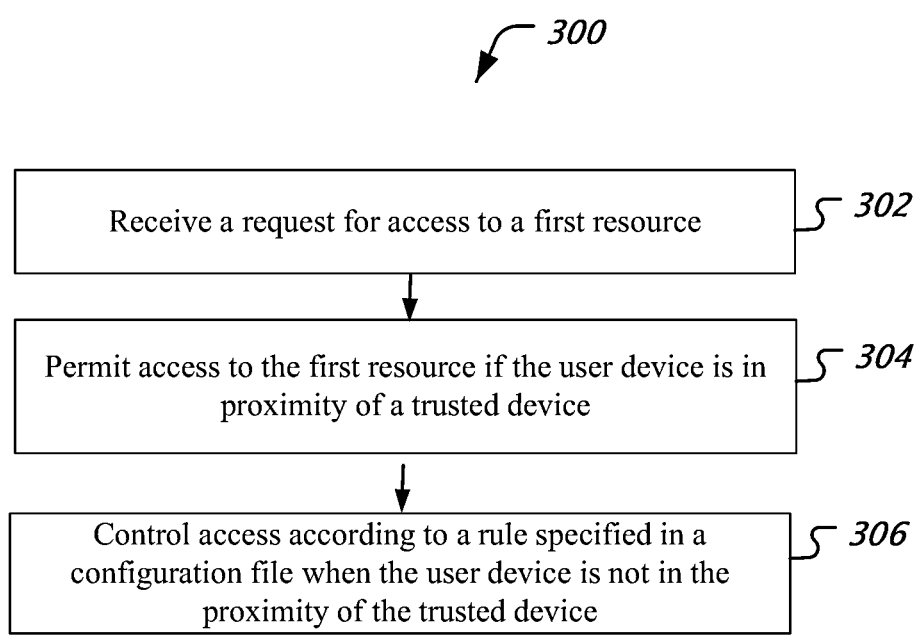
FIG. 3 is a flowchart representation of an example process of controlling access to applications on a user device.

FIG. 3 is a flowchart representation of an exemplary method 300 of controlling access to a user device. The access control may be used to selectively provide or deny access to applications available for launch from the user interface (e.g., a touchscreen) as disclosed in this document.

At 302, the method 300 receives, from a user interface, a request for access to a first resource of the user device. In various embodiments, the first resource may be a data or multimedia file stored on the user device, an application installed on the user device and executable from the user device, and so on.

At 304, the method 300 permits access to the first resource when the user device is in proximity of a trusted device. The determination of proximity may be based on signal strength. In some embodiments, the determination of proximity may be based on a communication in which global positioning system (GPS) coordinates are received from a nearby device and compared with the user device's own GPS location.

At 306, the method 300 controls access according to a rule specified in a configuration file when the user device is not in the proximity of the trusted device.

In some embodiments, a wireless interface (e.g., Bluetooth or Wi-Fi) presence of another device may be used and when presence of a device is detected, then a check is made regarding whether the detected device can become a trusted device, e.g., whether the detected device is owned by another adult member of the family, in which case the other device is allowed to control access.

Figure 4:
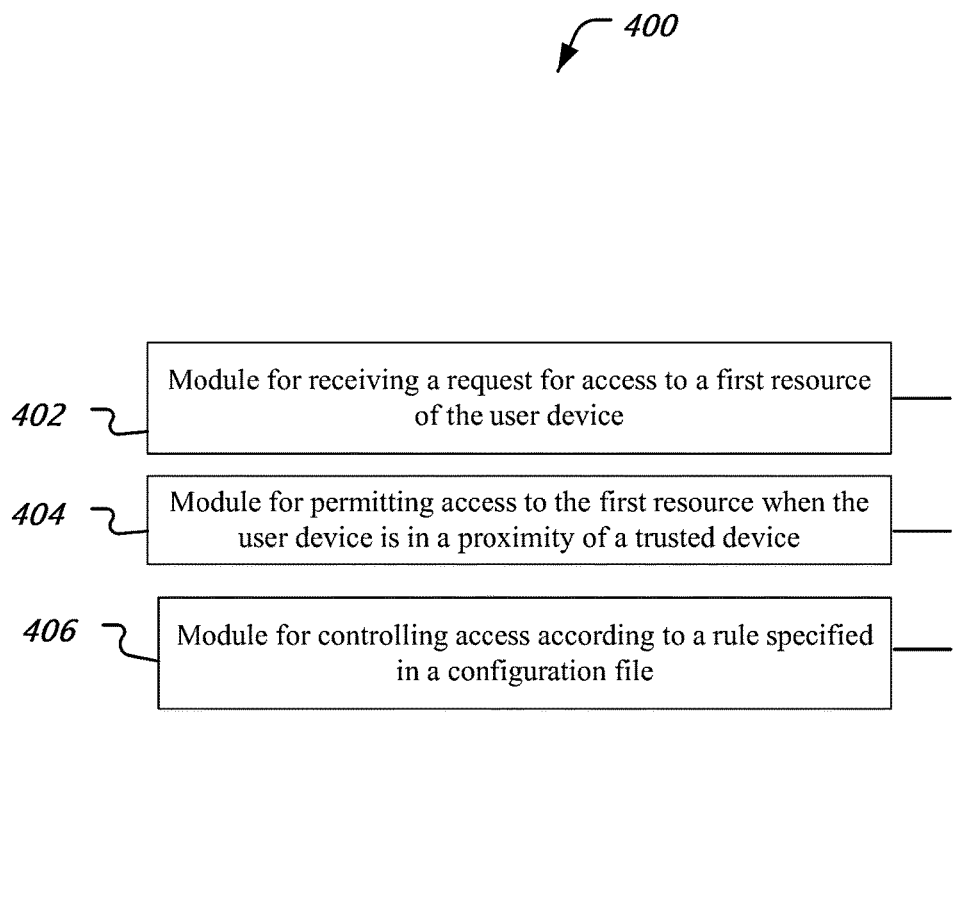
FIG. 4 depicts an example apparatus for controlling access to applications on a user device.

FIG. 4 is a block diagram representation of an exemplary apparatus 400 for controlling access to applications installed on a user device. The module 402 is for receiving, from a user interface, a request for access to a first resource of the user device. The module 404 is for permitting access to the first resource when the user device is in proximity of a trusted device. The module 406 is for controlling access according to a rule specified in a configuration file when the user device is not in the proximity of the trusted device. The apparatus 400 and modules 402, 404, 406 may further be configured to implement some of the techniques disclosed in the present document.

In some embodiments, an apparatus for controlling access to resources of a user device includes a launch sensing module that monitors whether an access to a resource of the user device is received at a user interface, and when the access is requested, then generates an access notification, a user device control module that receives the access notification and permits access to the resource only when a trusted device is in a proximity of the user device and a proximity sensing module that determines presence of a trusted device in the proximity of the user device. As previously disclosed, in some embodiments, the resource includes a software application executable on the user device and wherein the user device control module controls access to the resource based on a time at which the access notification is received. The access notification may be sent to the trusted (parent) user at an email address or phone number or using some other electronic communication medium. In some embodiments, a log may be maintained and made available to the trusted user to monitor usage of a user device.

Figure 5:
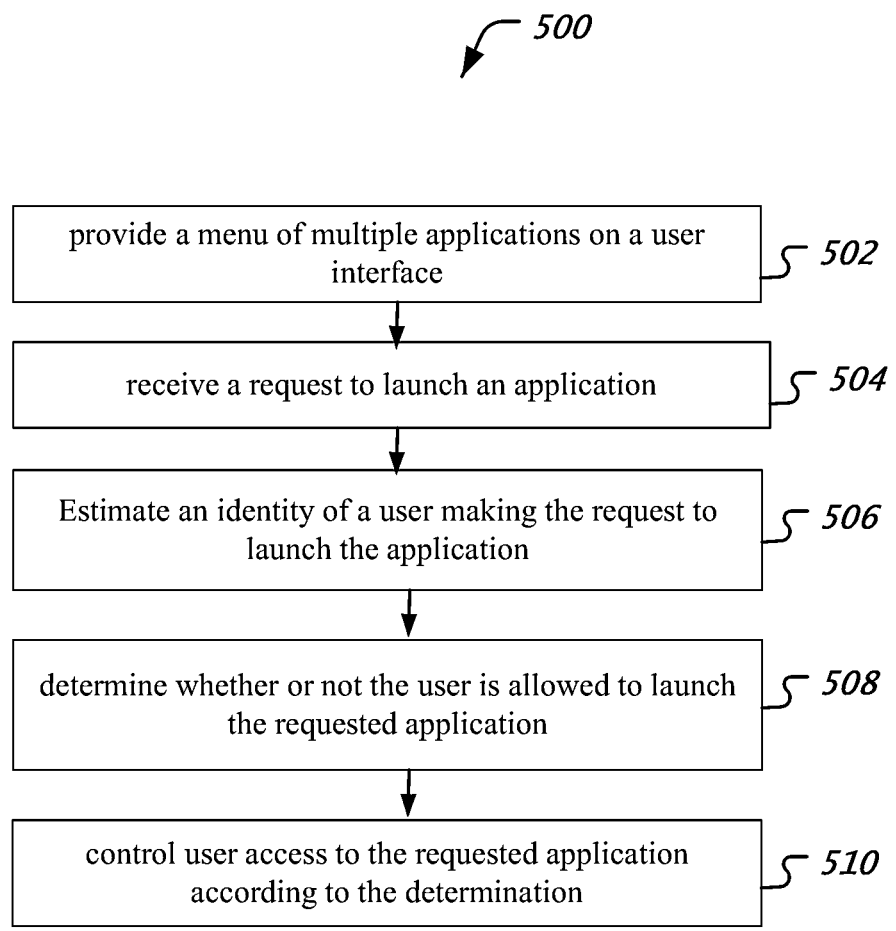
FIG. 5 is a flowchart representation of an example process of controlling access to applications on a user device.

FIG. 5 is a flowchart representation of an exemplary method 500 of controlling application-level access offered by a user device.

At 502, the method 500 provides a menu of multiple applications on a user interface. A visual indication may be provided next to the icon for each application about whether the application is freely available or is subject to access control rules described in the present document. In some embodiment, the menu may be a command prompt. The user may be able to directly invoke an application without a graphical or an explicit menu listing of available applications.

At 504, the method 500 receives a request to launch an application.

At 506, the method 500 estimates, based on a user behavior, an identity of a user making the request to launch the application. The estimation may be performed using one or more of techniques for determining user identity based on user behavior, as described in the present document. For example, in some embodiments, one or more questions may be posed on the user interface. At least one response is received from a user at the user interface. The user's age is determined from the received response. Criteria such as maturity level, complexity of a mathematical problem, the time taken to respond and the type of question responded to may be used in determining who possible user may be. For example, in one embodiment, if a user answers sports related questions, then this may weigh in favor of deciding that the user is the family son. In some embodiments, as previously disclosed, biometric measurements may be performed to estimate the user's identity.

At 508, the method 500 determines, based on a current access policy and the estimated user identity, whether or not the user is allowed to launch the requested application. The current access policy might be enforced via a configuration file received from a control server. In some embodiments, the configuration file includes time duration or an expiration time, at the end of which, the configuration file is replaced with a new configuration file. In some embodiments, a control interface may be presented to a user upon the user's request to allow the user to make changes to the configuration file.

At 510, the method 500 controls user access to the requested application according to the determination. For example, when it is determined that the user is a child, in response to his touching an application icon (or mouse clicking or another way to invoke the application), instead of executing the app and presenting the initial screen of the app, a different application might "step in" and present a dialog to the user that he/she is not allowed to access the application. In some embodiments, the user may also be given a reason for the denial. For example, "allotted time quota is over" or "no adult present" or "access denied according to policy" and so on.

Figure 6:
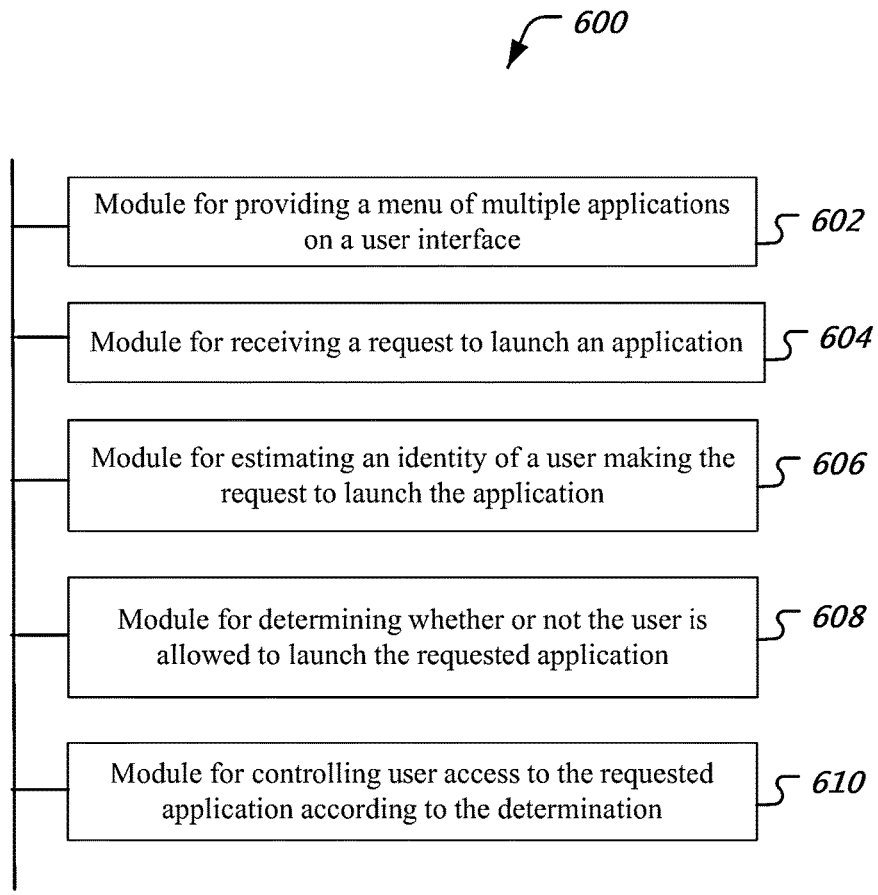
FIG. 6 depicts an example apparatus for controlling access to applications on a user device.

FIG. 6 is a block diagram representation of an exemplary apparatus 600 for controlling access to applications. The module 602 if for providing a menu of multiple applications on a user interface. The menu may be in the form of a command prompt from which the user can directly invoke an application for execution. The module 604 is for receiving a request to launch an application. The module 606 is for estimating, based on a user behavior, an identity of a user making the request to launch the application. The module 608 is for determining, based on a current access policy and the estimated user identity, whether or not the user is allowed to launch the requested application. The module 610 is for controlling user access to the requested application according to the determination.

Figure 7:
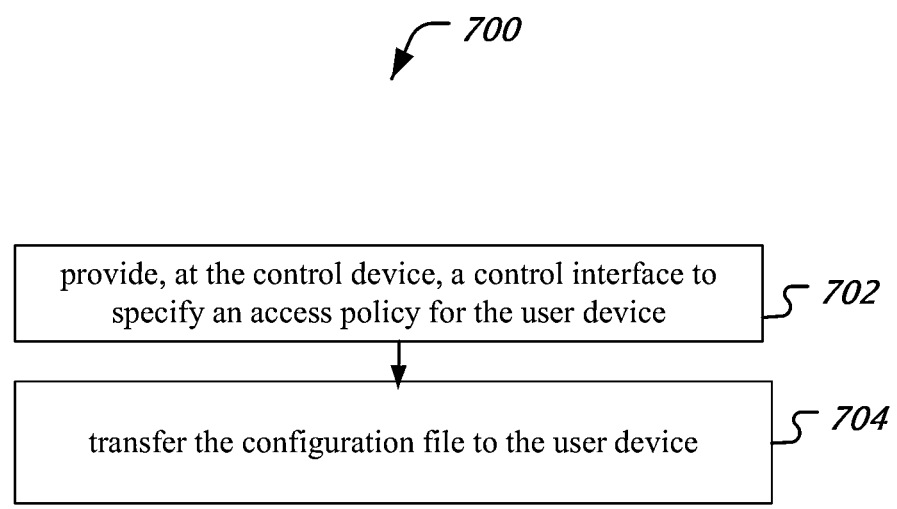
FIG. 7 is a flowchart representation of an example process of controlling access to applications on a user device.

FIG. 7 is a flowchart description of an exemplary method 700 of controlling application-level access offered by a user device, by operating a control device communicatively coupled to the user device over a communication network.

At 702, the method 700 provides, at the control device, a control interface to specify an access policy for the user device. In some embodiments, the access policy specifies, for an application on the user device, a rule that specifies conditions for allowing access to the application, denying access to the application and allow access with a notification to the application.

At 704, the method 700 transfers the configuration file to the user device for the user device to control application-level access to applications installed on the user device.

Figure 8:
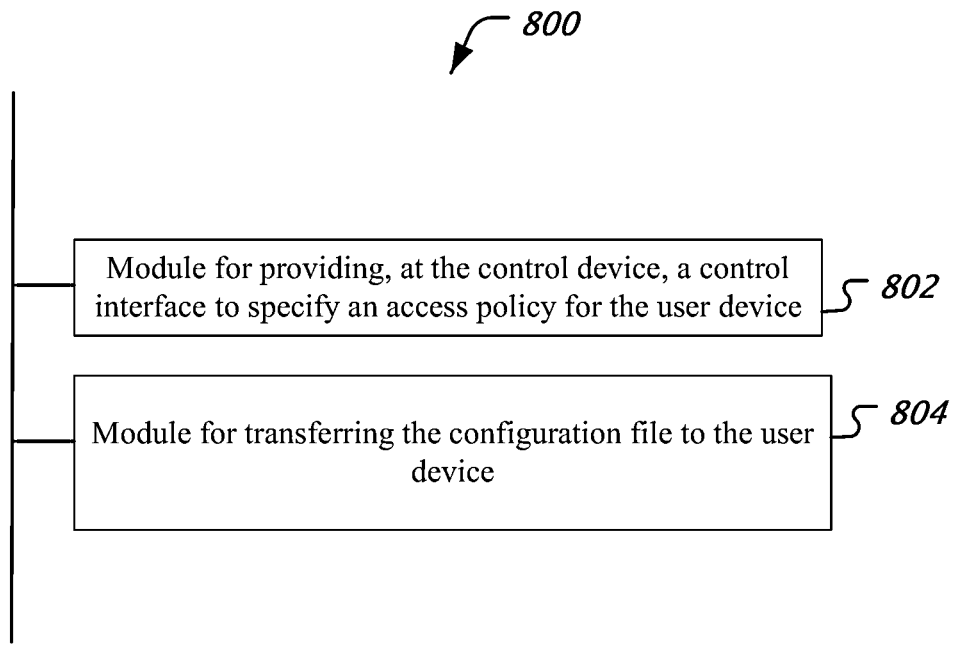
FIG. 8 depicts an example apparatus for controlling access to applications on a user device.

FIG. 8 is a block diagram representation of an exemplary apparatus 800 for controlling application-level access offered by a user device. The module 802 (e.g., a control interface module) is for providing, at the control device, a control interface to specify an access policy for the user device. The module 804 (e.g., a communication module) is for transferring the configuration file to the user device for the user device to control application-level access to applications installed on the user device. The access policy specifies, for an application on the user device, a rule that specifies conditions for allowing access to the application, denying access to the application and allowing access with a notification to the application.

In some embodiments, an apparatus for controlling application-level access offered by a user device includes a control interface module that displays a control interface allowing entry of an access policy for the user device. The control interface module may, e.g., display the control interface on a display (e.g., touch screen) associated with the user device. This arrangement may allow a user to directly interact with the user device via touch screen to enter the access policy for the user device. The access policy specifies rules for a user device to control application-level access to applications installed on the user device. The apparatus includes a configuration file module that generates a configuration file from the received access policy. The apparatus includes a communication module that transfers the configuration file to the user device.

Figure 9:
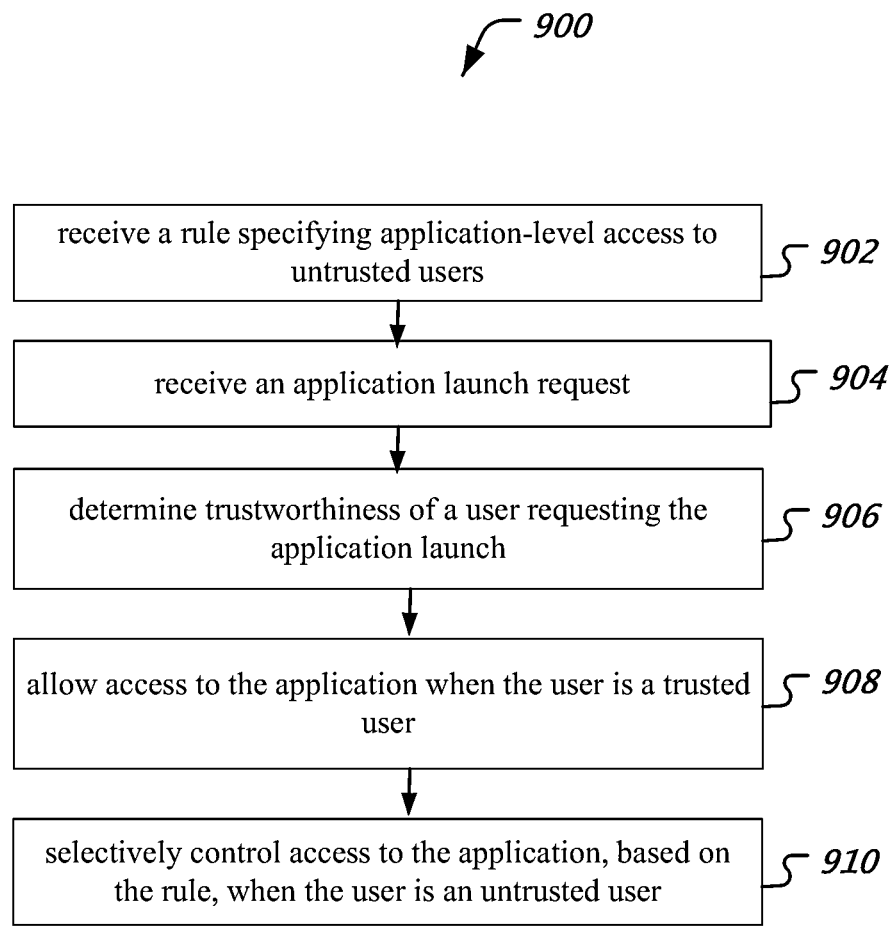
FIG. 9 is a flowchart representation of an example process of controlling access to applications on a user device.

FIG. 9 is a flowchart representation of an exemplary method 900 of controlling application-level access at a user device.

At 902, the method 900 receives, at the user device, a rule specifying application-level access to untrusted users. For example, in some embodiments, the rule may identify a group of applications for which the rule is applicable. When applications are installed, or after installation, each application may be associated with one or more groups (e.g., video game, educational, application for which total play time is to be controlled, and so on). A rule may state that the rule is application to "video games." By doing so, the rule may be used to control launch of applications that are included in the video games group, but not for applications that are not included in this group.

At 904, the method 900 receives an application launch request.

At 906, the method 900 determines trustworthiness of a user requesting the application launch.

At 908, the method 900 allows access to the application when the user is a trusted user. A trusted user may be, e.g., the user who has registered to be the user of the user device (e.g., during activation of the device) or may be any adult user.

At 910, the method 900 selectively controls access to the application, based on the rule, when the user is an untrusted user. In some embodiments, a user whose identity does not match may be considered to be an untrusted user. In some embodiments, a user whose identity cannot be determined by sufficiently high level of confidence may be considered an untrusted user.

Figure 10:
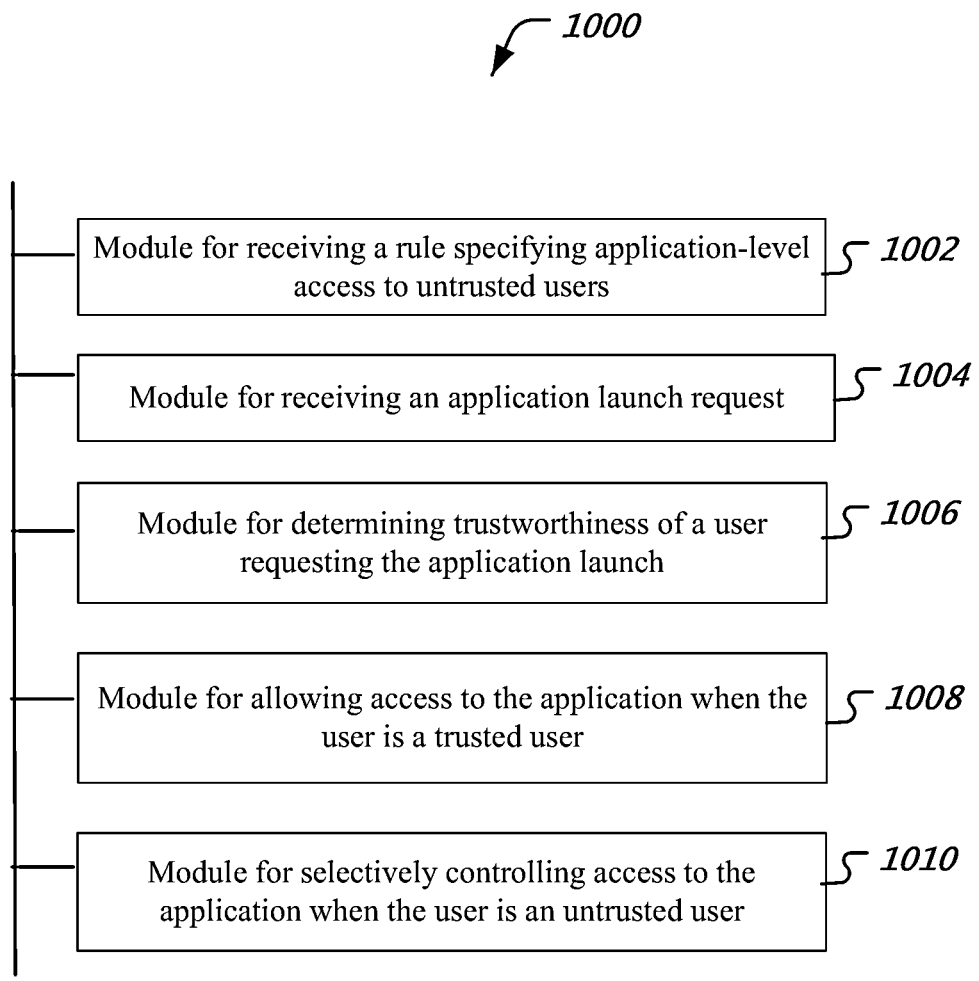
FIG. 10 depicts an example apparatus for controlling access to applications on a user device.

FIG. 10 is a block diagram representation of an exemplary apparatus 1000 for controlling application-level access at a user device. The module 1002 is for receiving, at the user device, a rule specifying application-level access to untrusted users. The module 1004 is for receiving an application launch request. The module 1006 is for determining whether or not a user requesting the application launch is a trusted user. The module 1008 is for allowing access to the application when the user is a trusted user. The module 1010 is for selectively controlling access to the application, based on the rule, when the user is an untrusted user.

It will be appreciated that techniques have been provided for controlling access to resources on a user device. In some embodiments, the disclosed techniques can be used by a parent or a trusted user of a user device to limit access by another user (e.g., a child) to the applications available for execution on the user device.

It will further be appreciated that techniques have been provided for automatically, or through user interaction, determining a user's identity.

It will further be appreciated that the disclosed techniques can be used to control access to a user device by enforcing a set of rules from a web-based control server. For example, a parent at work can monitor or control his son's or daughter's access to the tablet device left at home by interfacing with a web based server, which then in turn enforces an access policy on the tablet device.

The disclosed and other embodiments, the functional operations and modules described in this document (e.g., launch sensing module, a user device control module, a proximity sensing module, a control interface module, a configuration file module, a communication module, a logic module etc.) can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment.

Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of controlling application-level access offered by a user device, by operating a control device communicatively coupled to the user device over a communication network; comprising:
   providing, at the control device, a control interface to specify an access policy for the user device, the access policy specifying, for an application on the user device, a rule that specifies conditions for allowing access to the application, denying access to the application and allowing access with a notification to the application, the conditions being dependent upon an identity of a user, the control interface allowing specifying a global access policy that is applicable to all applications installed on the user device as the access policy;
   transferring the access policy to the user device;
   determining, by the user device, the identity of the user by:
      detecting a trusted device in a proximity of the control device,
      estimating the identity based on a user behavior received from the user in response to a query to the user configured to test an attribute of the user, or a combination thereof; and
   controlling, by the user device, application-level access to applications installed on the user device in accordance with the access policy and determined identity of the user.

2. The method of claim 1, wherein the rule for access with the notification includes an identity of a trusted user to whom to send the notification.

3. The method of claim 2, wherein the notification comprises notifying a parent user.

4. The method of claim 1, wherein the estimating the identity of the user includes:
   posing one or more question on the user interface;
   receiving at least one response to the posed one or more questions; and
   estimating a user's age based on the received at least one response.

5. The method of claim 1, wherein the estimating the identity of the user includes:
   performing a biometric measurement.

6. The method of claim 1, wherein the estimating the identity of the user includes:
   receiving a contextual input; and
   estimating a user's age based on the received contextual input.

7. The method of claim 1, wherein the providing the control interface to specify the access policy includes:
   providing a user-device-specific interface that enables overriding the global access policy for a specific user device.

8. A system for controlling application-level access offered by a user device; comprising:
   an apparatus comprising at least one apparatus processor and at least one apparatus non-transitory memory containing instructions that, when executed by the at least one apparatus processor, cause the at least one apparatus processor to perform processing comprising:
      displaying a control interface allowing entry of an access policy for the user device, the access policy specifying, for an application on the user device, a rule that specifies conditions for allowing access to the application, denying access to the application and allowing access with a notification to the application, the conditions being dependent upon an identity of a user, the control interface allowing specifying a global access policy that is applicable to all applications installed on the user device as the access policy;
      generating a configuration file from the access policy; and
      transferring the configuration file to the user device; and
   the user device comprising at least one user device processor and at least one user device non-transitory memory containing instructions that, when executed by the at least one user device processor, cause the at least one user device processor to perform processing comprising:
      determining the identity of the user by:
         detecting a trusted device in a proximity of the control device,
         estimating the identity based on a user behavior received from the user in response to a query to the user configured to test an attribute of the user, or a combination thereof, and
      controlling application-level access to applications installed on the user device in accordance with the access policy and determined identity of the user.

9. The system of claim 8, wherein the configuration file module includes in the configuration file a time during which the configuration file is to remain effective.

* * * * *